March 31, 1953     G. P. WACHTELL     2,633,530
PULSE GENERATING CIRCUIT
Filed Oct. 19, 1945
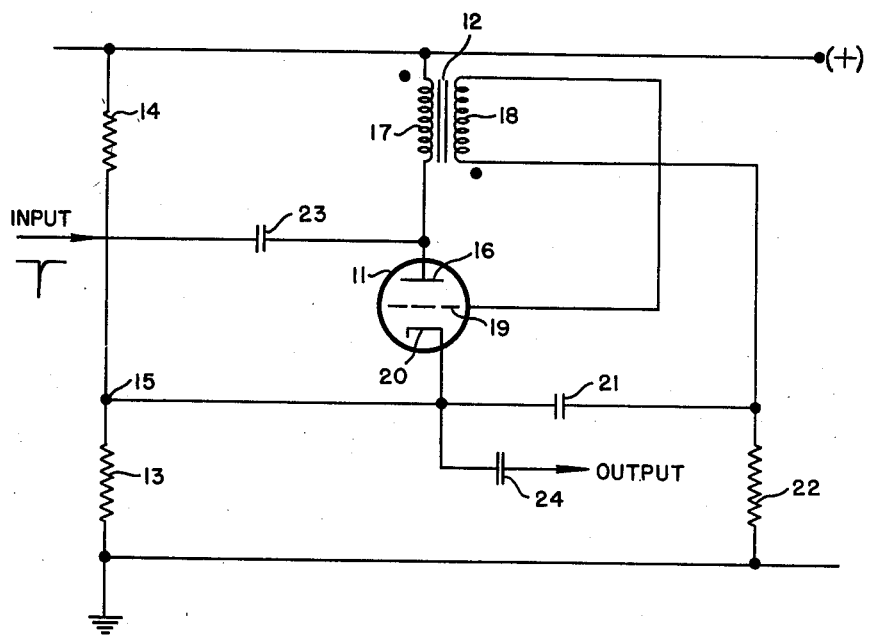
INVENTOR.
GEORGE P. WACHTELL
BY William D. Hall
ATTORNEY.

Patented Mar. 31, 1953

2,633,530

UNITED STATES PATENT OFFICE 2,633,530

PULSE GENERATING CIRCUIT

George P. Wachtell, Cambridge, Mass., assignor, by mesne assignments, to the United States of America as represented by the Secretary of War Application October 19, 1945, Serial No. 623,392

3 Claims. (Cl. 250—27)

This invention relates generally to electrical circuits and more particularly to pulse generating circuits.

In one type of pulse generating circuit the control grid and anode of a vacuum tube are coupled together by a transformer in a regenerative manner. The control grid employs grid leak biasing and the cathode is normally grounded. Such a circuit is known to those skilled in the art as a blocking oscillator.

Blocking oscillators as well as other pulse generating circuits sometimes do not produce a pulse whose leading edge is sufficiently steep for accurate ranging, and the like when used with radio objects locating devices. Also some pulse generating circuits do not produce pulses of sufficient amplitude.

It is an object of this invention to provide a circuit which when initiated by a signal will produce a desired output pulse.

It is a further object to provide a circuit which will produce an output pulse whose leading edge is very steep.

It is a still further object to provide a circuit whose output pulse has a desirably high amplitude.

Other objects, features, and advantages of this invention will suggest themselves to those skilled in the art and will become apparent from the following description of the invention taken in connection with the accompanying drawing in which the sole figure is a circuit diagram of one embodiment of the invention.

Referring now to the drawing, the circuit comprises a vacuum tube 11, pulse transformer 12, and a voltage divider network. Said voltage divider network is connected between a source of positive potential and ground and consists of resistor 13 and resistor 14 in series. The junction of resistors 13 and 14 is identified as 15. Anode 16 of tube 11 is connected to the source of positive potential through the primary winding 17 of the pulse transformer 12. One terminal of the secondary winding 18 of pulse transformer 12 is connected to control grid 19 of vacuum tube 11. The other terminal of the secondary winding 18 is coupled to cathode 20 of vacuum tube 11 through capacitor 21 and is returned to ground through resistor 22. The cathode 20 is connected to the point 15.

In operation, the cathode 20 is at a positive potential due to the voltage divider action of resistors 13 and 14, the grid is normally at ground potential, and the vacuum tube 11 is normally maintained in a nonconducting state. Negative trigger pulses are applied to the anode 16 of vacuum tube 11 through coupling capacitor 23. It will be seen from the polarity markings of the pulse transformer 12 that a negative input trigger will cause the voltage between cathode 20 and control grid 19 to decrease. This will cause the vacuum tube 11 to conduct. Conduction will cause the anode to drop in potential, thereby causing the grid to rise in potential. This regenerative action continues until the vacuum tube 11 is operating in the non-linear saturation region. Conduction will then start decreasing, causing the anode 16 to rise in potential, thereby causing the control grid 19 to drop in potential. When the voltage between cathode 20 and control grid 19 reaches cut-off potential, conduction will stop. There will be a positive overshoot at the anode 16 due to self-inductance of the primary winding. This will cause a negative overshoot in the cathode control grid voltage. Meanwhile, capacitor 21 has become charged due to grid current and control grid 19 remains below ground potential for a time depending on the time constant of capacitor 21, resistor 13, and resistor 22. The output pulses are taken from the cathode 20 through a coupling capacitor 24.

It should be noted that since the output voltage is taken between the cathode 20 and ground, the output capacitance will be comparatively low, and therefore the output pulse will have a relatively steep leading edge. It should be further noted that if the value of resistor 13 is properly chosen with respect to the vacuum tube 11 and primary winding 17 resistance, the amplitude of the output pulse will be relatively greater than, for example, the voltage across a tertiary winding of pulse transformer 12.

It will be seen that the input voltage to this circuit is effectively applied between cathode 20 and control grid 19 and the output voltage is effectively taken between cathode 20 and ground. It will also become apparent to those skilled in the art, that the circuit herein set forth might be considered a blocking oscillator connected in a boot-strap manner.

The description hereinbefore contained has referred to the biasing of control grid 19 in accordance with the time constant of capacitor 21, resistor 13 and resistor 22. This is true in actual practice where 13 is small compared to the value of 14. If the values are comparable, then the value of resistor 14 also would have to be considered.

It will be seen that the circuit herein set forth will produce an output pulse whose leading edge is substantially vertical and whose amplitude is relatively high.

While there has been described what is at present considered to be the preferred embodiment of this invention, it will be obvious to those skilled in the art that various changes and modifications may be made therein without departing from the scope of the invention as set forth in the appended claims, and I claim all such changes and modifications as fall fairly within the spirit and scope thereof.

What I claim is:

1. In a pulse generating circuit, a vacuum tube having a cathode, control grid and an anode, means for coupling negative trigger pulses to said anode of said vacuum tube, a pulse transformer having a primary and a secondary winding, said primary winding being connected between said anode of said vacuum tube and a source of positive potential, capacitive means for coupling a first terminal of said secondary winding to said cathode of said vacuum tube, means for connecting a second terminal of said secondary winding to said control grid of said vacuum tube, said secondary winding being connected in a regenerative manner, resistive means for connecting said first terminal of said secondary winding to ground, voltage divider means for connecting said cathode of said vacuum tube to a positive potential, and means for coupling output pulses from said cathode of said vacuum tube.

2. A pulse generating circuit comprising a vacuum tube having at least a cathode, a control grid, and an anode, means coupled to said tube for biasing said tube normally below cut-off, a pulse transformer having a primary winding connected to said anode and a secondary winding connected on one side to said grid, a resistance connecting the other side of said secondary winding to ground, a capacitor connecting said other side of said secondary winding to said cathode, means for applying trigger pulses to said secondary winding, a load impedance connecting said cathode to ground, and means for coupling output pulses from said cathode load impedance.

3. A pulse generating circuit comprising a vacuum tube whose elements include an anode, at least one grid, and a cathode, means for regeneratively coupling said anode and said grid so as to cause said tube to function as a blocking oscillator, means for biasing said oscillator normally below cutoff, load impedance means connected between said cathode and ground potential, means for applying trigger pulses between said grid and said cathode, and means for coupling a sharp, high power pulse from said impedance when a trigger pulse causes said oscillator to become operative.

GEORGE P. WACHTELL.

REFERENCES CITED

The following references are of record in the file of this patent:

UNITED STATES PATENTS

| Number | Name | Date |
|---|---|---|
| 2,160,052 | Banks | May 30, 1939 |
| 2,212,202 | Faudell et al. | Aug. 20, 1940 |
| 2,284,337 | Mulert et al. | May 26, 1942 |
| 2,411,573 | Holst et al. | Nov. 26, 1946 |

FOREIGN PATENTS

| Number | Country | Date |
|---|---|---|
| 110,491 | Australia | May 16, 1940 |
| 435,196 | Great Britain | Sept. 17, 1935 |